Patented Feb. 16, 1943

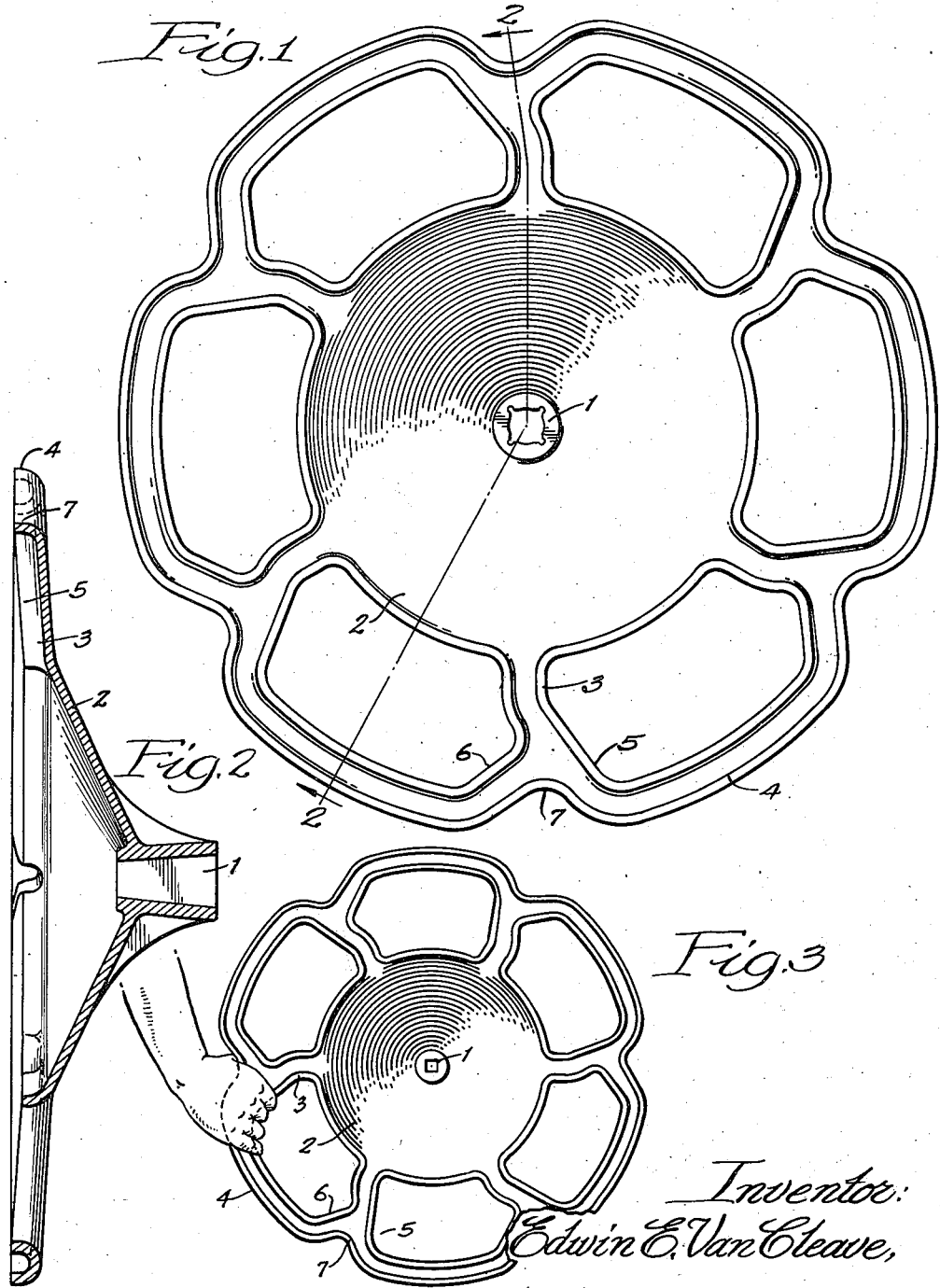

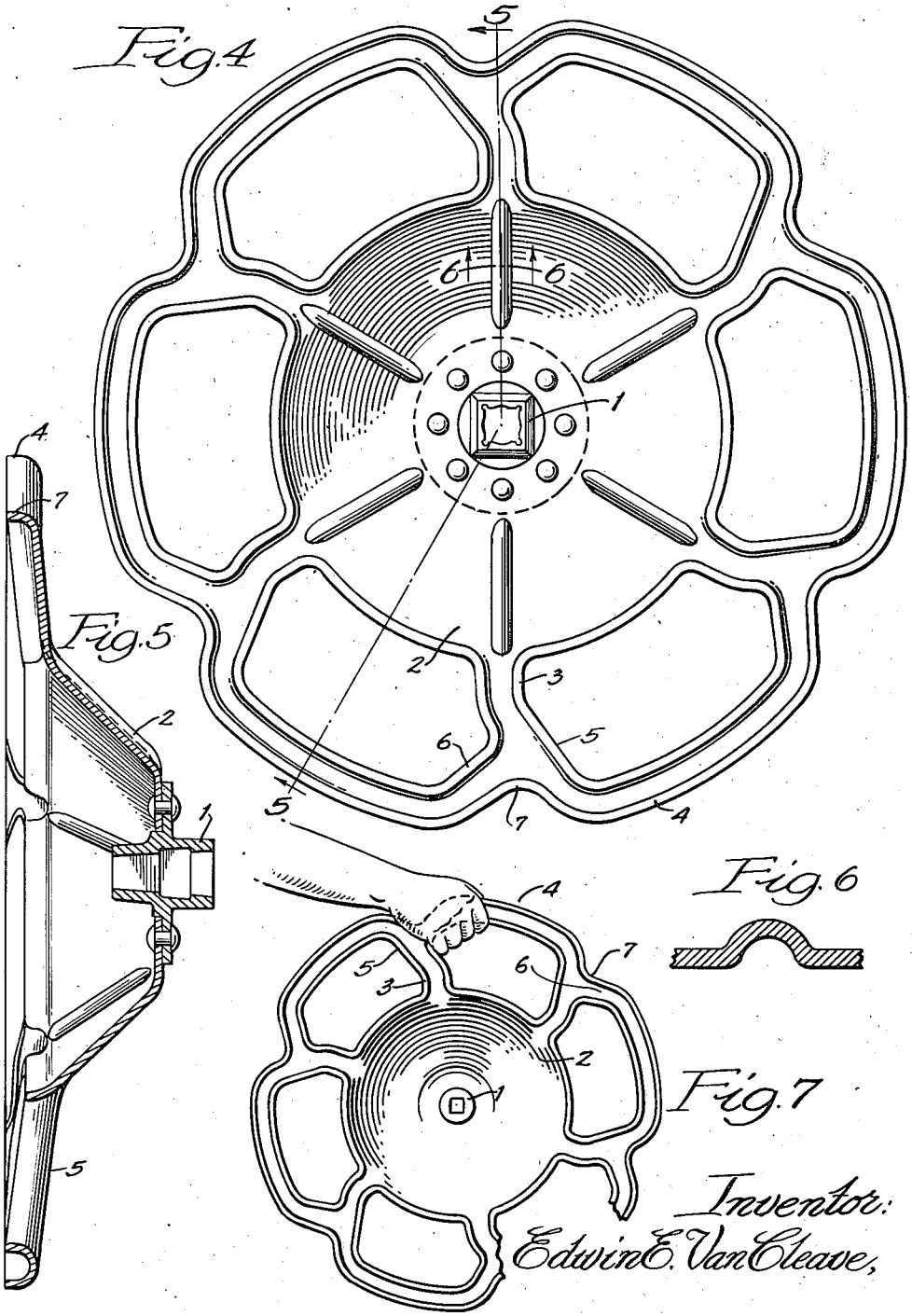

2,311,269

UNITED STATES PATENT OFFICE 2,311,269

HANDWHEEL

Edwin E. Van Cleave, Chicago, Ill.

Application July 13, 1940, Serial No. 345,301

2 Claims. (Cl. 74—552)

This invention relates to hand wheels and particularly the type employed on railway car hand brakes. Hand wheels have been and are manufactured in many different designs of rims and spokes including irregularly-shaped spokes and rims. It has been most practicable to grip either the rim or a spoke of the wheel. This disclosure is directed to spokes and rim sections modified at their meeting point so as to give maximum comfort to the hand of the operator. The grip formed by the spokes and the rim of this hand wheel gives an extended arc of operation with the minimum of wrist bending.

The objects of this invention are to provide a hand wheel which will give the brakeman a more efficient grip and an increased range of leverage in operation; to provide a hand wheel of such character which is applicable to the wheel shafts of the standard hand brake mechanisms; to provide a hand wheel which, when properly grasped, will not slip in the hands of the brakeman; and to provide a hand wheel which is simple and economical to manufacture.

One of the dangers present when operating a railway car hand brake employing the standard hand wheel is that of a slippery rim, which, if not tightly grasped, will slip in the brakeman's hand and possibly throw him from the platform of the railway car. The hand wheel set forth in this specification overcomes this danger to a great extent. The rounded angle formed at the merging point of the spoke and rim sections of the herein described hand wheel presents a more secure grip than a standard wheel as heretofore manufactured.

An illustrative embodiment of the above-entitled invention will be found in the accompanying drawings, wherein:

Figure 1 is a front elevation of the hereindescribed hand wheel.

Fig. 2 is a side elevation in section taken on the line 2—2 of Fig. 1.

Fig. 3 is a front elevation of the wheel showing the hand of a brakeman applying the brake.

Fig. 4 is a front elevation of a modified form of the invention.

Fig. 5 is a side elevation in section taken on the line 5—5 of Fig. 4.

Fig. 6 is a partial cross section taken on the line 6—6 of Fig. 4.

Fig. 7 is a front elevation of the wheel showing the hand of a brakeman releasing the brake.

The hand wheel described herein comprises a rim with regularly spaced indentations supported by spokes radiating from the center of the wheel, and is applicable to any standard railway hand brake wheel shaft.

The hand wheel as illustrated comprises a hub 1 located in the center of and integrally a part of a disc 2. Spokes 3 are spaced equally and extend from the circumference of the disc wheel 2 to rim sections 4. Arms 5 and 6 which form the indentations support the rim sections 4 and are integrally a part thereof, as illustrated in Fig. 1 of the accompanying drawings and thus constitute inwardly turned portions at the ends of each rim section 4. It will be noted that the inwardly turned portion 5 used in turning the wheel clockwise extends at an angle of approximately 35° to a radius extending to the point of meeting of the inwardly turned portions, and that the inwardly turned portion 6 for use in turning the wheel counterclockwise extends at an angle of approximately 60° to said radius. Thus the operator's wrist will be bent at only a small angle when either of said inwardly turned portions is grasped. Recesses 7 are formed in the rim of the hand wheel opposite each spoke. Said recesses 7 aid the brakeman in getting a non-slipping grip on the hand wheel.

The hand wheel shown in Figs. 1 and 2 is one made from a single casting. It has been difficult to manufacture the continuous-rim type wheel because of the cracking during the shrinkage of the mold. The shrinkage in the rim of the continuous-rim type hand wheel is much more rapid than it is in the rest of the wheel; therefore, the tendency is for the rim to crack and even split while cooling. In this sectional-rim type wheel the difficulty has been overcome. The rapid shrinkage in the rim is compensated for by the flexibility of the indentations of the rim.

When applying the brake the brakeman grasps the wheel, as shown in Fig. 3 of the accompanying drawings, with his right-hand and pulls upward and toward himself. In order to release the brake, the brakeman grasps the upper side of the wheel with his right-hand, as shown in Fig. 7, and pulls toward himself. It can readily be seen from observation of Figs. 3 and 7 that the shape of the wheel rim and spokes fits the clenched hand of the brakeman and enables him to bring his thumb completely around the spokes so as to produce a firm and comfortable grip on the wheel. It will also be noted that by having the rim sections 4 concentric with the axis of the wheel all sharp protuberances are avoided so that there is no danger of the brakeman being injured should he be thrown against the wheel during the lurching of the car.

Although but one specific embodiment of this invention is herein shown and described, it is to be understood that details set forth may be altered or omitted without departing from the spirit of the invention as defined by the following claims.

I claim:

1. A handwheel adapted to be mounted on a horizontal axis to be operated by a man standing at one side thereof, comprising a central portion, spokes, and rim sections, each rim section having inwardly turned portions at its ends respectively adapted to be grasped by the operator to turn the wheel in opposite directions, each of said inwardly turned portions meeting the inwardly turned portion of the adjacent rim section, the inwardly turned portion for use in turning the wheel clockwise extending at an angle of approximately 35° to a radius extending to the point of meeting of the inwardly turned portions, and the inwardly turned portion for use in turning the wheel counterclockwise extending at an angle of approximately 60° to said radius, whereby the operator's wrist will be bent at only a small angle when either of said inwardly turned portions are grasped, the spokes extending from said central portion to said point of meeting.

2. A handwheel adapted to be mounted on a horizontal axis to be operated by a man standing at one side thereof, comprising a central portion, spokes, and rim sections concentric with the axis of the wheel, each rim section having inwardly turned portions at its ends respectively adapted to be grasped by the operator to turn the wheel in opposite directions, each of said inwardly turned portions meeting the inwardly turned portion of the adjacent rim section, the inwardly turned portion for use in turning the wheel clockwise extending at an angle of approximately 35° to a radius extending to the point of meeting of the inwardly turned portions, and the inwardly turned portion for use in turning the wheel counterclockwise extending at an angle of approximately 60° to said radius, whereby the operator's wrist will be bent at only a small angle when either of the inwardly turned portions is grasped, the spokes extending from said central portion to said point of meeting, the concentric arrangement of the rim sections and angular position of said inwardly turned portions avoiding any sharp protuberances at the periphery of the wheel.

EDWIN E. VAN CLEAVE.